(12) United States Patent
Umeda et al.

(10) Patent No.: US 9,197,072 B2
(45) Date of Patent: Nov. 24, 2015

(54) CHARGING DEVICE INCLUDING A HOUSING RECESS

(71) Applicant: TOYODA GOSEI CO., LTD., Kiyosu-shi (JP)

(72) Inventors: Yukihiko Umeda, Kiyosu (JP); Kazushi Noda, Kiyosu (JP); Tetsu Mizushiro, Kiyosu (JP)

(73) Assignee: TOYODA GOSEI CO., LTD., Kiyosu-shi, Aichi-ken (JP)

( * ) Notice: Subject to any disclaimer, the term of this patent is extended or adjusted under 35 U.S.C. 154(b) by 428 days.

(21) Appl. No.: 13/686,834

(22) Filed: Nov. 27, 2012

(65) Prior Publication Data
US 2013/0134937 A1 May 30, 2013

(30) Foreign Application Priority Data

Nov. 28, 2011 (JP) ................................. 2011-258596

(51) Int. Cl.
*H01M 10/46* (2006.01)
*H02J 7/00* (2006.01)
*B60L 11/18* (2006.01)

(52) U.S. Cl.
CPC .............. *H02J 7/00* (2013.01); *B60L 11/1818* (2013.01); *B60L 2230/12* (2013.01); *B60L 2230/16* (2013.01); *B60L 2250/16* (2013.01); *Y02T 10/7005* (2013.01); *Y02T 10/7088* (2013.01);
(Continued)

(58) Field of Classification Search
CPC ..... H02J 7/025; Y02T 10/7005; Y02T 90/14; Y02T 10/705; Y02T 10/7088

USPC .......... 320/107, 108, 109, 132; 362/540, 548, 362/459
See application file for complete search history.

(56) References Cited

U.S. PATENT DOCUMENTS

| 5,751,135 | A | * | 5/1998 | Fukushima et al. | .......... 320/107 |
| 5,757,595 | A |   | 5/1998 | Ozawa et al. | |
| 8,134,334 | B2 |  | 3/2012 | Suzuki et al. | |

(Continued)

FOREIGN PATENT DOCUMENTS

| JP | H3-121920 A | 5/1991 |
| JP | H6-325834 A | 11/1994 |

(Continued)

OTHER PUBLICATIONS

Notification of Reason(s) for Refusal dated Feb. 25, 2014, with English translation.

*Primary Examiner* — Edward Tso
(74) *Attorney, Agent, or Firm* — McGinn IP Law Group PLLC

(57) ABSTRACT

A charging device charges an in-vehicle battery for an electric vehicle by a power supply fed from an attachment plug extending from an external power supply. The charging device includes: a charging inlet; a housing recess formed within the charging inlet; a charging connector disposed within the housing recess; and an illumination light source embedded in an upper peripheral wall of the housing recess. The illumination light source emits light downward, and an optical axis thereof is positioned closer to an opening of the housing recess than a front surface of the charging connector. A first irradiation light emitted toward the opening of the housing recess than the optical axis is emitted obliquely downward from the charging inlet. A second irradiation light emitted toward a bottom of the housing recess than the optical axis is emitted to the charging connector.

9 Claims, 4 Drawing Sheets

(52) U.S. Cl.
CPC .............. *Y02T 90/121* (2013.01); *Y02T 90/128* (2013.01); *Y02T 90/14* (2013.01); *Y02T 90/163* (2013.01)

(56) References Cited

U.S. PATENT DOCUMENTS 8,226,284 B2 * 7/2012 Markyvech et al. .......... 362/540
2010/0026238 A1 * 2/2010 Suzuki et al. ................. 320/109
2011/0291612 A1 * 12/2011 Fujitake ........................ 320/107

FOREIGN PATENT DOCUMENTS

| JP | 9-285022 A | 10/1997 |
| JP | 2003-327041 A | 11/2003 |
| JP | 2008-254700 A | 10/2008 |
| JP | 2011-183860 A | 9/2011 |

* cited by examiner

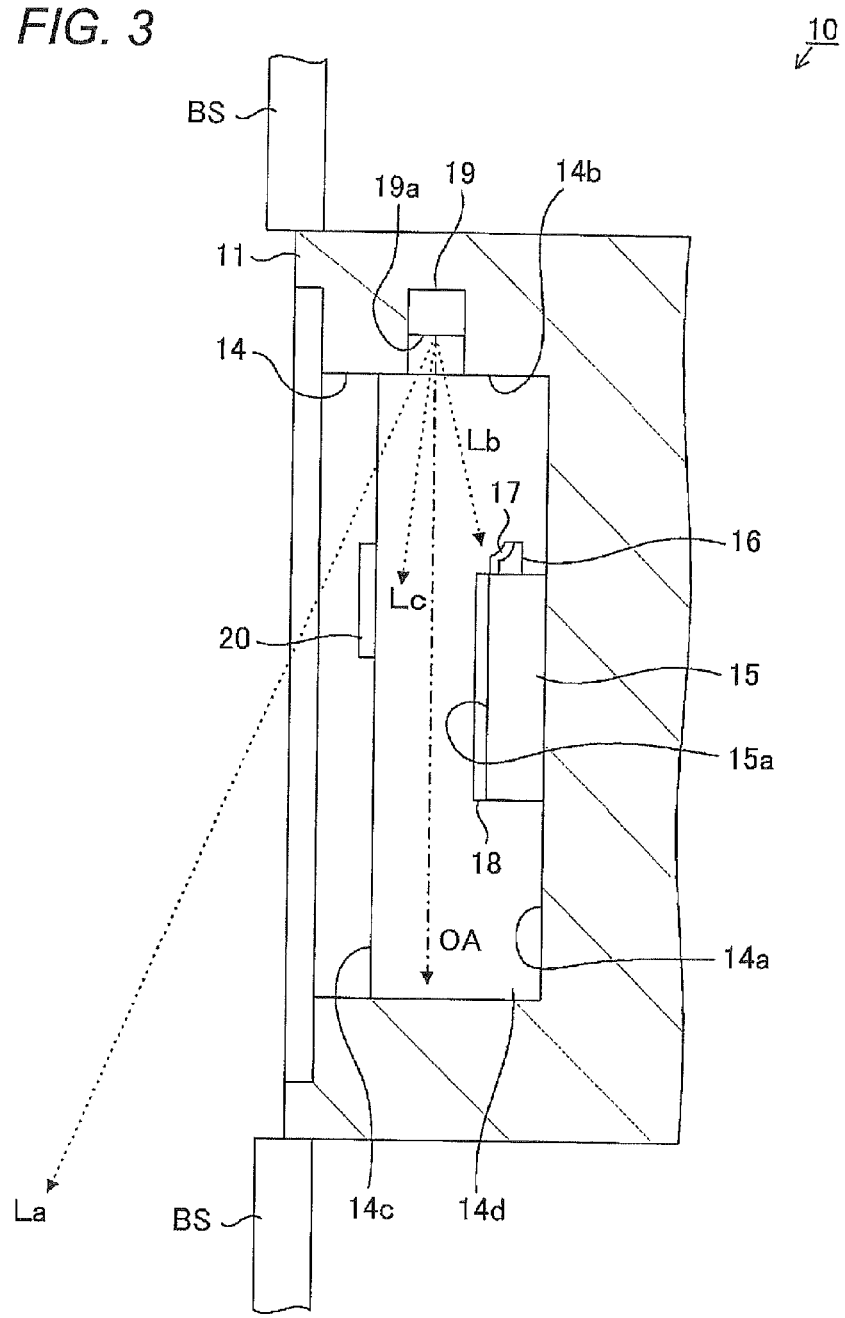

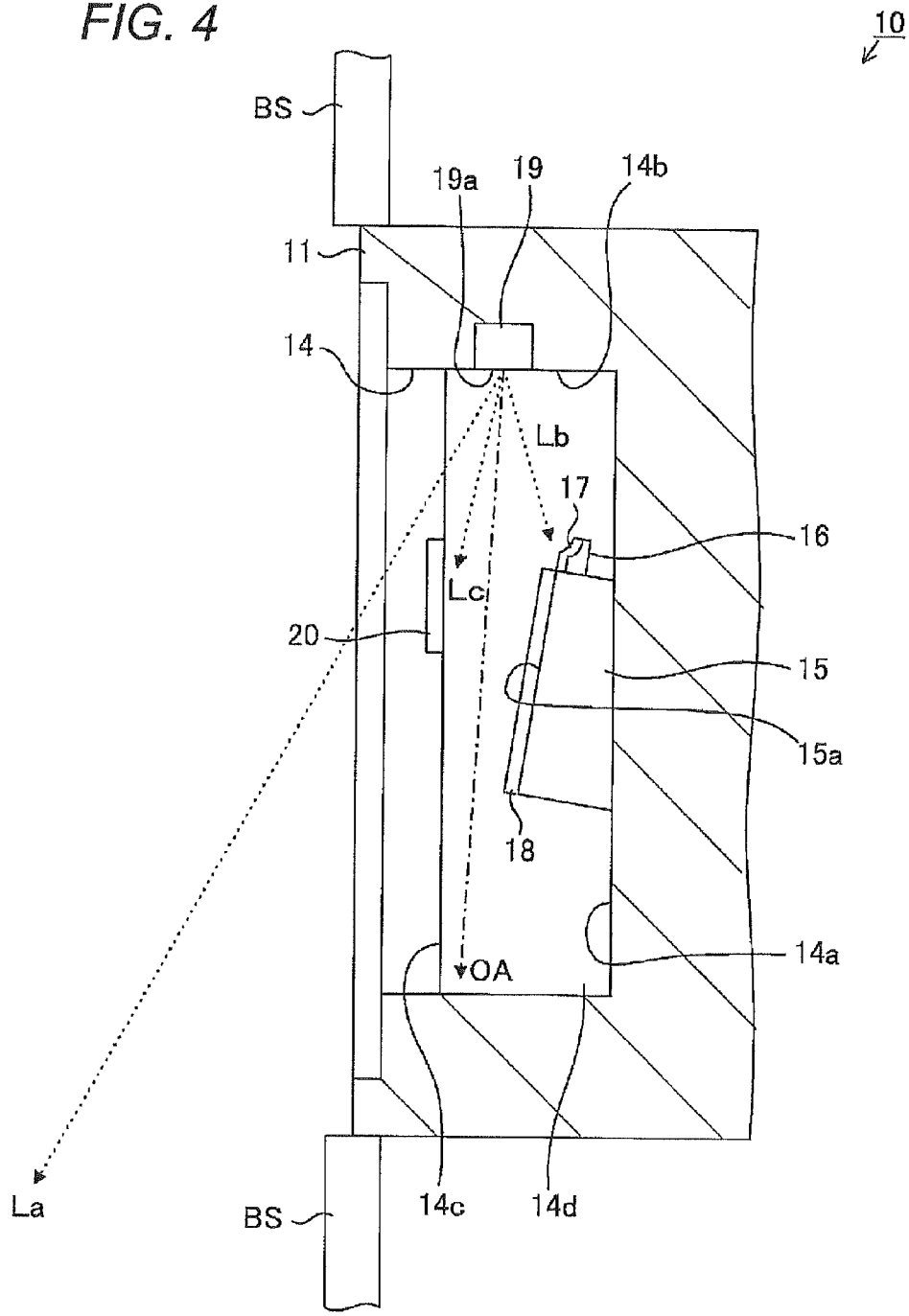

CHARGING DEVICE INCLUDING A HOUSING RECESS

BACKGROUND

1. Technical Field

The present invention relates to a charging device, and more particularly to a charging device equipped in an electric vehicle.

2. Background Art

An electric vehicle (electric transport device) such as an EV (electric vehicle) or a PHV (plug-in hybrid vehicle) includes a charging device for charging an in-vehicle battery. An attachment plug extending from an external power supply is coupled to a charging connector (power receiving unit) of the charging device which is arranged on an outer surface of a vehicle body to conduct charging operation.

Patent Document 1 a vehicle including: an electric-power receiving unit disposed in an accommodation unit formed to be concave with respect to the vehicle external surface of the vehicle body; an illumination unit for applying light to the electric-power receiving unit; a lid for preventing intrusion of rain water into the electric-power receiving unit; and a light transmission member that is disposed in the lid and allows light from the illumination unit to transmit therethrough. In the vehicle, a part of the light applied by the illumination unit transmits through the light transmission member and is guided to an outside of the vehicle, whereby a user who operates the attachment plug to visually perceive a position of the power receiving unit.

Patent Document 2 describes an apparatus for displaying a charging state of a battery of an electric vehicle. The apparatus includes a digital display unit for digitally displaying a period of time required until the battery is fully charged and a charged capacity of the battery. The digital display unit is disposed in a cavity of the charging connector (recess formed in an outer panel of a vehicle body) covered with a lid.

Patent Document 1: US 2010/0026238 A1 (JP-A-2008-254700)

Patent Document 2: U.S. Pat. No. 5,757,595 (JP-A-9-285022)

SUMMARY

When the attachment plug is coupled to the charging connector, if a puddle exists at the feet of the user who operates the attachment plug, there is a risk that the user gets a shock. For that reason, it is important to check the user's feet, and there is a need to light the feet under the circumstances where the surrounding of the vehicle body is dark.

However, in Patent Document 1, the light guided through the light transmission member to the outside of the vehicle is not applied to the feet of the user who operates the attachment plug. Therefore, the user's feet cannot be illuminated.

Patent Document 2 describe a lamp (a remaining capacity display unit 40 and a remaining charging time display unit 42) that indicates display contents of the digital display unit (see col. 3, lines 52-67 of Patent Document 2), but fails to disclose an illuminating unit that illuminates the digital display unit.

For that reason, in Patent Document 2 the display of the digital display unit is hardly visually recognized under the circumstances where the surrounding of the vehicle body is dark.

If the techniques of Patent Document 1 and Patent Document 2 are combined together, if an installation location of the illumination unit in Patent Document 1 is improper, glare occurs due to the light of the illumination unit. Also, the light from the illumination unit is directly applied to the digital display unit of Patent Document 2, and the amount of applied light of the illumination unit becomes larger than the amount of light of the digital display unit, thereby causing so-called "blown out highlights." This leads to a case that the display of the digital display unit is hardly visually recognized.

Patent Document 1 merely describes "illumination unit 212 may be disposed at any position as long as it can apply light to accommodation unit 208 . . . a configuration in which illumination unit 212 is provided on a vertically upper side of accommodation unit 208 is illustrated as a typical example" (see paragraph 0057 of Patent Document 1).

For that reason, it would be difficult for even an ordinary skilled person to conceive the installation location of the illuminating unit which can enhance the visibility of the digital display unit based on the disclosure in Patent Documents 1 and 2.

The present invention has been made in view of the above-described circumstances, and objects thereof are to provide:

(1) a charging device that can illuminate the feet of the user who operates the attachment plug in addition to the illumination of the charging connector; and (2) a charging device that enables illumination so as to enhance the visibility of the display unit which displays a charging state of the in-vehicle battery, in addition to the above (1).

As a result of earnestly studying for days and days for solving the above problem, the inventors have conceived the aspects of the present invention as described below.

<First Aspect>

According to a first aspect, there is provided a charging device that charges an in-vehicle battery for an electric vehicle by a power supply fed from an attachment plug extending from an external power supply, including: a charging inlet disposed in an outer surface of a vehicle body of the electric vehicle; a housing recess formed in an inside of the charging inlet; a charging connector disposed in an inside of the housing recess so as to be coupled with the attachment plug; and an illumination light source embedded in an upper peripheral wall of the housing recess, wherein the illumination light source emits light downward from an upper portion of the housing recess, wherein an optical axis of the illumination light source is positioned closer to an opening of the housing recess than a front surface of the charging connector, wherein a first irradiation light emitted toward the opening of the housing recess than the optical axis is emitted obliquely downward from the charging inlet, and wherein a second irradiation light emitted toward a bottom of the housing recess than the optical axis is emitted to the charging connector.

In the first aspect, the first irradiation light emitted obliquely downward from the charging inlet can illuminate the feet of a user who operates the attachment plug.

In this example, because the optical axis of the irradiation light source is positioned closer the opening of the housing recess than the front surface of the charging connector, the first irradiation light can be surely emitted obliquely downward from the charging inlet while the first irradiation light is not blocked by the charging connector.

As a result, even in a status where the surrounding of the vehicle body is dark, when the attachment plug is coupled to the charging connector, the user who operates the attachment plug can check the feet, and can operate the attachment plug in safety.

Therefore, according to the first aspect, there can be provided the charging device that can illuminate the feet of the user with the first irradiation light, in addition to the illumination of the charging connector by the second irradiation light.

<Second Aspect>

According to a second aspect, the charging device of the first aspect further includes: a display unit that is disposed in the inside of the charging inlet, and displays a charging state of the in-vehicle battery; and a light blocking unit that blocks the light of the illumination light source to prevent the display unit from being irradiated directly with the irradiation light, wherein the optical axis of the illumination light source is positioned closer the bottom of the housing recess than the display unit.

In the second aspect, because the optical axis of the illumination light source is positioned closer the bottom side of the housing recess than the display unit, the display unit can be surely prevented from being irradiated directly with the irradiation light of the illumination light source, with the provision of the light blocking unit. As a result, glare can be prevented from occurring due to the irradiation light of the illuminating light source. Also, the so-called "blown out highlights" caused when the amount of irradiation light of the illuminating unit becomes larger than the amount of light of the display unit can be prevented from occurring. This can prevent the display of the display unit from being difficult to visually recognize.

Therefore, according to the second aspect, there can be provided the charging device that enables illumination so as to enhance the visibility of the display unit that displays the charging state of the in-vehicle battery.

<Third Aspect>

According to a third aspect, there is provided the charging device of the second aspect, wherein an emission color of the illumination light source is different from a display color of the display unit.

According to the third aspect, because the irradiation light of the illumination light source and the display color of the display unit can be surely discriminated from each other, the visibility of the display unit can be improved.

<Fourth Aspect>

According to a fourth aspect, there is provided the charging device of the first to third aspects, further including: a locking member that protrudes from an upper portion of the charging connector, and is fitted into the attachment plug for locking; and a first optical member fixed to the locking member, wherein the first optical member has any one function selected from a group consisting of a function of reflecting the second irradiation light, a function of accumulating the first irradiation light, and a function of guiding the first irradiation light and radiating the first irradiation light toward the opening of the housing recess.

In the fourth aspect, the position of the locking member can be visually surely recognized by the first optical member in addition to a fact that the attachment plug and the charging connector are surely coupled to each other by the locking member. As a result, the positioning of the attachment plug relative to the charging connector can be facilitated.

<Fifth Aspect>

According to a fifth aspect, there is provided the charging device of the first to fourth aspects, further including: a second optical member arranged on a front surface of the charging connector, wherein the second optical member includes a member having any one function selected from a group consisting of a function of reflecting the second irradiation light, a function of accumulating the first irradiation light, and a function of guiding the first irradiation light and radiating the first irradiation light toward the opening of the housing recess.

In the fifth aspect, the front surface of the charging connector can be surely visually recognized by the second optical member. As a result, the positioning of the attachment plug relative to the charging connector can be further facilitated.

<Sixth Aspect>

According to a sixth aspect, there is provided the charging device of the first to fifth aspects, wherein a light emitting surface of the illumination light source is arranged to be flush with a mounting surface which is an upper peripheral wall surface of the housing recess, or arranged to be located on an upper side of the mounting surface.

Therefore, according to the sixth aspect, as compared with a case in which the light emitting surface of the illumination light source is protruded from the mounting surface of the housing recess, glare can be prevented from occurring due to the irradiation light of the illuminating light source. In addition, the illumination light source can be prevented from interfering with the attachment plug when the attachment plug is coupled to the charging connector, and the coupling of the attachment plug is facilitated.

<Seventh Aspect>

According to a seventh aspect, there is provided the charging device of the first to sixth aspects, wherein the optical axis of the illumination light source is inclined outward of the housing recess.

In the seventh aspect, because the first irradiation light is liable to be emitted outward of the vehicle body, a wide range of the feet of the user who operates the attachment plug can be illuminated. As a result, the operation and effects of the first aspect can be enhanced.

<Eighth Aspect>

According to an eighth aspect, there is provided the charging device of the first to seventh aspects, wherein the front surface of the charging connector is non-parallel to the optical axis of the illumination light source, and faces the light emitting surface of the illumination light source.

In the eighth aspect, because a member to be irradiated (the front surface of the charging connector, the locking member, the first optical member, the second optical member) is surely irradiated with the second irradiation light, the operation and effects of the fourth and fifth aspects can be enhanced.

BRIEF DESCRIPTION OF THE DRAWINGS

FIG. 3 is a vertical cross-sectional view of a main portion of a charging device according to another embodiment, which is taken along an arrow X-X in FIG. 1; and FIG. 4 is a vertical cross-sectional view of a main portion of a charging device according to yet another embodiment, which is taken along an arrow X-X in FIG. 1.

DETAILED DESCRIPTION

Hereinafter, a description will be given of a charging device 10 equipped in an electric vehicle according to an embodiment of the present invention with reference to the accompanying drawings.

Figure 1:
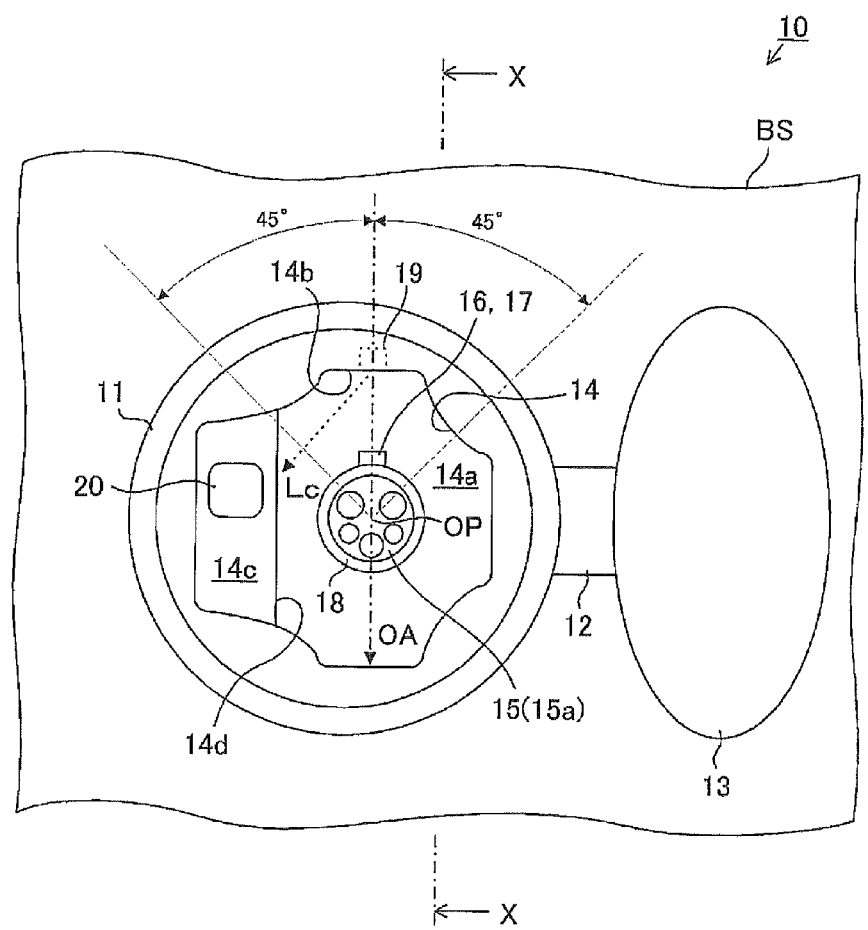
FIG. 1 is a front view of a charging device equipped in an electric vehicle according to one embodiment of the present invention.
Figure 2:
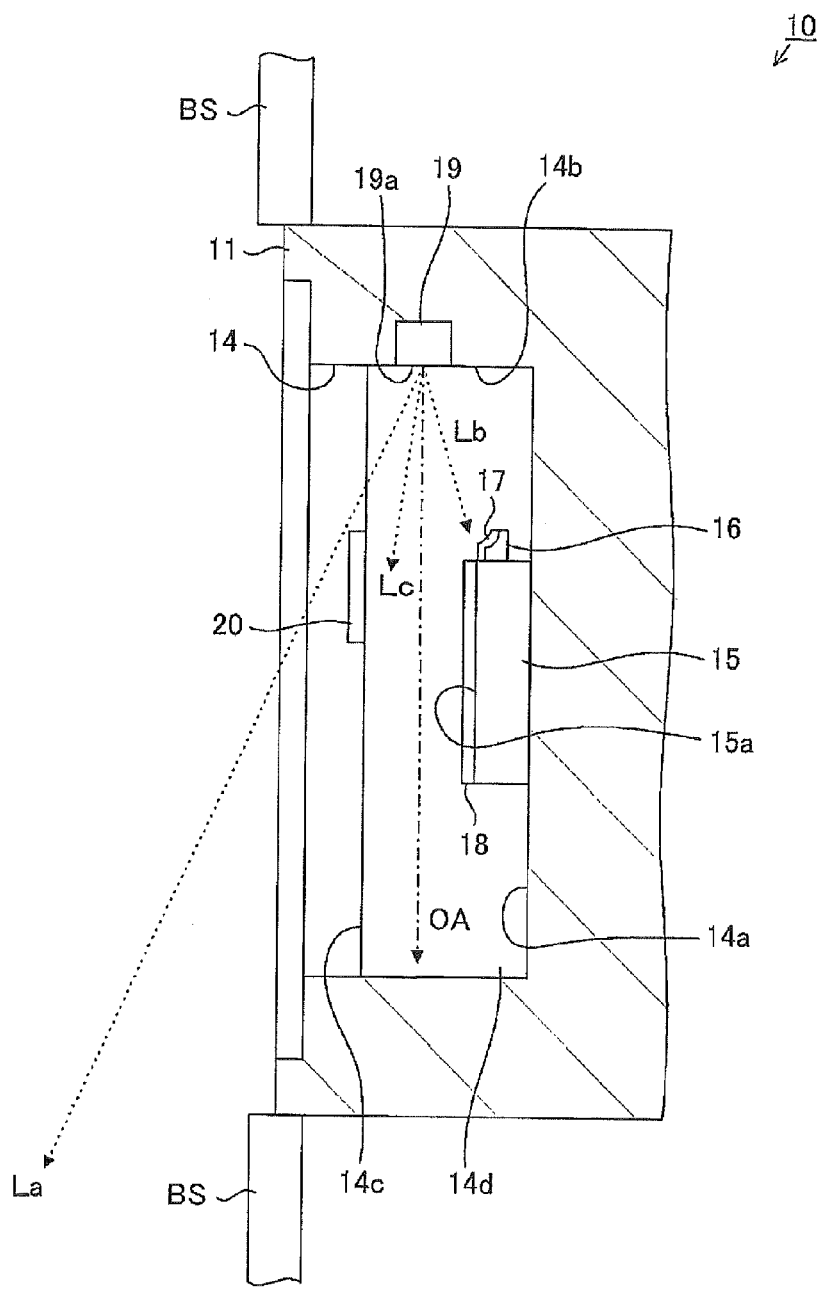
FIG. 2 is a vertical cross-sectional view of a main portion of the charging device, which is taken along an arrow X-X in FIG. 1.

As illustrated in FIGS. 1 and 2, the charging device 10 includes a charging inlet (power feeding unit) 11, a hinge 12, a lid (openable cap) 13, a housing recess 14 (a bottom surface 14a, a mounting surface 14b, a step surface 14c, a light blocking unit 14d), a charging connector 15 (a front surface 15a), a locking member (lock member) 16, reflection members 17 and 18, an illumination light source 19 (a light emitting surface 19a), and a display unit (indicator) 20.

The charging device 10 charges an in-vehicle battery (not shown) of an electric vehicle such as an EV or a PI-IV by a power supply fed from an attachment plug (not shown) extending from an external power supply (not shown).

A connection state between the charging device 10 and the in-vehicle battery, and a method of charging the in-vehicle battery by the charging device 10 are well known as disclosed in Patent Document 1 and patent Document 2, and therefore a description thereof will be omitted.

The circular charging inlet 11 is equipped on a vehicle body outer surface (body) BS of the electric vehicle.

The lid 13 is openably fitted to a right end of the charging inlet 11 in a front view through the hinge 12.

In a state where the lid 13 is closed, rain water can be prevented from entering the charging inlet 11 (not shown).

As illustrated in FIGS. 1 and 2, in a state where the lid 13 is opened, a front surface of the charging inlet 11 is opened, and members within the charging inlet 11 are exposed.

The housing recess 14 that is a recess concaved from the vehicle body outer surface BS is formed within the charging inlet 11.

The charging connector 15, the locking member 16, the reflection members 17 and 18, the illumination light source 19, and the display unit 20 are housed in the housing recess 14.

The substantially columnar charging connector 15 is arranged in a right position from a center of the charging inlet 11 in the front view, and protruded from the bottom surface 14a of the housing recess 14. The front surface 15a of the charging connector 15 is formed substantially in parallel to the vehicle body outer surface BS, and the attachment plug is inserted into the front surface 15a of the charging connector 15 so as to be coupled to the charging connector 15. That is, the front surface 15a of the charging connector 15 forms a coupling surface of the attachment plug.

The claw locking member 16 for fitting and locking the attachment plug are provided while positioning the attachment plug is protruded from an upper portion of the charging connector 15.

The reflection member 17 is fixedly mounted on the locking member 16.

The annular reflection member 18 is fixedly mounted on an outer peripheral edge of the front surface 15a of the charging connector 15. The dimensional configuration and arrangement position of the reflection member 18 are so set as not to inhibit the coupling of the attachment plug.

The illumination light source 19 is configured by, for example, an LED lamp, an organic EL lamp, or an incandescent Tamp, and embedded in an upper peripheral wall of the housing recess 14.

The light emitting surface 19a that is the outermost surface of the illumination light source 19 is arranged to be flush with the mounting surface 14b that is the upper peripheral wall surface of the housing recess 14. The illumination light source 19 emits white light downward from the upper portion of the housing recess 14.

The arrangement position of the illumination light source 19 relative to the charging connector 15 is set so that an optical axis OA of the illumination light source 19 is positioned on a front side (the opening side of the housing recess 14, the outer side of the vehicle body outer surface BS) with respect to the front surface 15a of the charging connector 15.

Also, the arrangement position of the illumination light source 19 relative to the charging connector 15 is set so that the optical axis OA of the illumination light source 19 passes through a center point OP of the front surface 15a of the charging connector 15.

For that reason, a first irradiation light La emitted on the front side of the optical axis OA of the illumination light source 19 is emitted obliquely downward of the charging inlet 11, and illuminates the feet (not shown) of the user who operates the attachment plug.

Also, a second irradiation light Lb emitted on the back side (an opposite side of the front side, a bottom surface 14a side of the housing recess 14) of the optical axis OA of the illumination light source 19 is emitted to the front surface 15a of the charging connector 15, the locking member 16, and the reflection members 17, 18, and illuminates those members.

The reflection member 17 which is the first optical member and the reflection member 18 that is the second optical member reflect the second irradiation light Lb to the front side.

As with the display panel of Patent Document 2, the display unit 20 displays a charging state (for example, a time required to fully charge the in-vehicle battery, a charged capacity, etc.) of the in-vehicle battery by the charging device 10 by an appropriate display method (for example, display using characters, numbers, or marks) (not shown).

The display color of the display unit 20 is set to a color (for example, red, blue, green, etc.) surely distinguishable from white color which is the emission color of the illumination light source 19.

The rectangular display unit 20 is arranged on a left side of the charging connector 15 in the front view, and fixedly mounted on the step surface 14c raised above the bottom surface 14a of the housing recess 14 toward the front side.

The arrangement position of the illumination light source 19 relative to the display unit 20 is set so that the optical axis OA of the illumination light source 19 is positioned on the back side of the display unit 20.

The irradiation light of the illumination light source 19 includes an irradiation light Lc emitted on the front side of the optical axis OA and also emitted on the left side of the charging inlet 11 in the front view.

The step surface 14c of the housing recess 14 is formed substantially in parallel to the bottom surface 14a, and a wall surface connecting the step surface 14c and the bottom surface 14a functions as the light blocking unit 14d that blocks the irradiation light Lc of the illumination light source 19, and prevents the irradiation light Lc from being emitted directly to the display unit 20.

Operation and Effects of this Embodiment

The charging device 10 according to this embodiment can obtain the following operation and effects.

(1) The first irradiation light La emitted obliquely downward of the charging inlet 11 can illuminate the feet of the user who operates the attachment plug.

In this example, because the optical axis OA of the illumination light source 19 is positioned on the front side (the opening side of the housing recess 14) of the front surface 15a of the charging connector 15, the irradiation light La can be surely emitted obliquely downward of the charging inlet 11 while the irradiation light La is not blocked by the charging connector 15.

As a result, even in a status where the surrounding of the vehicle body is dark, when the attachment plug is coupled to the charging connector 15, the user who operates the attachment plug can check the feet, and can operate the attachment plug 15 in safety.

(2) The light emitting surface 19a of the illumination light source 19 is so arranged as to be flush with the mounting surface 14b of the housing recess 14.

For that reason, as compared with a case in which the light emitting surface 19a of the illumination light source 19 is protruded from the mounting surface 14b of the housing recess 14, glare can be prevented from occurring due to the irradiation light of the illuminating light source 19. In addition, the illumination light source 19 can be prevented from interfering with the attachment plug when the attachment plug is coupled to the charging connector 15, and the coupling of the attachment plug is facilitated.

(3) Because the optical axis OA of the illumination light source 19 is positioned on the back side of the display unit 20 (the bottom side 14a of the housing recess 14), the display unit can be surely prevented from being irradiated directly with the irradiation light of the illumination light source 19, with the provision of the light blocking unit 14d. As a result, glare can be prevented from occurring due to the irradiation light of the illuminating light source 19. Also, the so-called "blown out highlights" caused when the amount of irradiation light of the illuminating unit becomes larger than the amount of light of the display unit 20 can be prevented from occurring. This can prevent the display of the display unit 20 from being difficult to visually recognize.

(4) The white color that is the emission color of the illumination light source 19 and the display color of the display unit 20 are different from each other, and the irradiation light of the illumination light source 19 and the display color of the display unit 20 can be surely discriminated from each other. For that reason, the visibility of the display unit 20 can be improved.

(5) The position of the locking member 16 can be visually surely recognized by the reflection member 17 that reflects the irradiation light Lb of the illumination light source 19 in addition to a fact that the attachment plug and the charging connector 15 are surely coupled to each other by the locking member 16. As a result, the positioning of the attachment plug relative to the charging connector 15 can be facilitated.

(6) The front surface 15a of the charging connector 15 can be surely visually recognized by the reflection member 18 that reflects the irradiation light Lb of the illumination light source 19. As a result, the positioning of the attachment plug relative to the charging connector 15 can be further facilitated.

(7) Because the display unit 20 is arranged on the left side of the charging connector 15 in the front view, there is no risk that when the user holds the attachment plug by his right hand to couple the attachment plug to the charging connector 15, the display unit 20 hides behind the user's hand to inhibit the visibility.

Another Embodiment

The present invention is not limited to the above embodiment, but may be embodied as follows. Similarly, in this case, the operation and effects equivalent to or higher than those of the above embodiment can be obtained.

(A) As illustrated in FIG. 3, the light emitting surface 19a of the illumination light source 19 may be arranged on the upper (deeper) side of the mounting surface 14b of the housing recess 14, and in this case, the same operation and effects as those in the above item (2) are obtained.

(B) As illustrated in FIG. 4, the illumination light source 19 may be mounted on the housing recess 14 so that the optical axis OA of the illumination light source 19 is inclined with an appropriate angle in the outside direction (outside direction of the vehicle body).

In this case, the first irradiation light La emitted on the front side of the optical axis OA of the illumination light source 19 is liable to be emitted toward the outside direction of the vehicle body as compared with the embodiment illustrated in FIG. 2. As a result, since a wide range of the feet of the user who operates the attachment plug can be illustrated, the operation and effects of the above item (1) can be enhanced.

The inclined angle of the optical axis OA of the illumination light source 19 may be set to an experimental optimum value.

(C) As illustrated in FIG. 4, the charging connector 15 may be formed so that the front surface 15a of the charging connector 15 is nonparallel to the optical axis OA of the illumination light source 19, and faces the light emitting surface 19a of the illumination light source 19.

In this case, because the member to be irradiated (the front surface 15a of the charging connector 15, the locking member 16, the optical members 17, 18) is surely irradiated with the second irradiation light Lb emitted on the back side of the optical axis OA of the illumination light source 19 as compared with the embodiment illustrated in FIG. 2, the operation and effects of the above items (5) and (6) can be enhanced.

The elevation angle of the front surface 15a of the charging connector 15 may be set to an experimental optimum value.

(D) The charging connector 15 may be arranged in the inside of the housing recess 14, and the front surface 15a of the charging connector 15 may be arranged to be flush with the bottom surface 14a of the housing recess 14, or may be arranged on the back side of the bottom surface 14a of the housing recess 14.

(E) The reflection members 17 and 18 may be replaced with a light accumulating member that is an optical member accumulating the second irradiation light Lb.

Also, the reflection members 17 and 18 may be replaced with a light guide member that is an optical member that guides the second irradiation light Lb, and irradiates the front side.

In those cases, the operation and effects as those in the above items (5) and (6) are also obtained.

(F) As illustrated in FIG. 1, the illumination light source 19 may be arranged in a range of 45° on the right and left sides in the front view, immediately above the center point OP of the front surface 15a of the charging connector 15.

(G) If the illumination light source 19 can obtain sufficient illumination intensity, the emission light is not limited to white, but may be any color. In this case, it is necessary that the emission color of the illumination light source 19 is made different from the display color of the display unit 20, and the display of the display unit 20 is surely visually recognized.

(H) The above respective embodiments may be implemented in appropriate combination, and in this case, the operation and effects of the combined embodiments may be combined together, and the synergetic effect can be obtained.

The present invention is not limited to the description of the respective aspects and the respective embodiments. The present invention includes a variety of modified embodiments without departing from the definition of the claims and within a range that can be easily conceived by an ordinary skilled person. The documents specified in the present specification, and the contents such as the patent publications and patents are cited with the aid of all contents of those publications.

What is claimed is:

1. A charging device that charges an in-vehicle battery for an electric vehicle by a power supply fed from an attachment plug extending from an external power supply, comprising:
   a charging inlet disposed in an outer surface of a vehicle body of the electric vehicle;
   a housing recess formed in an inside of the charging inlet;
   a charging connector disposed in an inside of the housing recess so as to be coupled with the attachment plug; and
   an illumination light source embedded in an upper peripheral wall of the housing recess, wherein the illumination light source emits light downward from an upper portion of the housing recess,
   wherein an optical axis of the illumination light source is positioned closer to an opening of the housing recess than a front surface of the charging connector,
   wherein a first irradiation light emitted toward the opening of the housing recess than the optical axis is emitted obliquely downward from the charging inlet, and
   wherein a second irradiation light emitted toward a bottom of the housing recess than the optical axis is emitted to the charging connector,
   the charging device further comprises a display unit that is disposed in the inside of the charging inlet, and displays a charging state of the in-vehicle battery,
   wherein the optical axis of the illumination light source is positioned closer to the bottom of the housing recess than the display unit.

2. The charging device according to claim 1, further including:
   a second optical member arranged on a front surface of the charging connector,
   wherein the second optical member comprises a member having any one function selected from a group consisting of a function of reflecting the second irradiation light, a function of accumulating the first irradiation light, and a function of guiding the first irradiation light and radiating the first irradiation light toward the opening of the housing recess.

3. The charging device according to claim 1, wherein a light emitting surface of the illumination light source is arranged to be flush with a mounting surface which comprises an upper peripheral wall surface of the housing recess, or arranged to be located on an upper side of the mounting surface.

4. The charging device according to claim 1, wherein the optical axis of the illumination light source is inclined outward of the housing recess.

5. The charging device according to claim 1, wherein the front surface of the charging connector is non-parallel to the optical axis of the illumination light source, and faces the light emitting surface of the illumination light source.

6. The charging device according to claim 1, wherein an emission color of the illumination light source is different from a display color of the display unit.

7. A charging device that charges an in-vehicle battery for an electric vehicle by a power supply fed from an attachment plug extending from an external power supply, the charging device comprising:
   a charging inlet disposed in an outer surface of a vehicle body of the electric vehicle;
   a housing recess formed in an inside of the charging inlet;
   a charging connector disposed in an inside of the housing recess so as to be coupled with the attachment plug; and
   an illumination light source embedded in an upper peripheral wall of the housing recess, wherein the illumination light source emits light downward from an upper portion of the housing recess,
   wherein an optical axis of the illumination light source is positioned closer to an opening of the housing recess than a front surface of the charging connector,
   wherein a first irradiation light emitted toward the opening of the housing recess than the optical axis is emitted obliquely downward from the charging inlet, and
   wherein a second irradiation light emitted toward a bottom of the housing recess than the optical axis is emitted to the charging connector,
   the charging device further comprising:
   a display unit that is disposed in the inside of the charging inlet, and displays a charging state of the in-vehicle battery; and
   a light blocking unit that blocks the light of the illumination light source to prevent the display unit from being irradiated directly with the irradiation light,
   wherein the optical axis of the illumination light source is positioned closer to the bottom of the housing recess than the display unit.

8. The charging device according to claim 7, wherein an emission color of the illumination light source is different from a display color of the display unit.

9. A charging device that charges an in-vehicle battery for an electric vehicle by a power supply fed from an attachment plug extending from an external power supply, the charging device comprising:
   a charging inlet disposed in an outer surface of a vehicle body of the electric vehicle;
   a housing recess formed in an inside of the charging inlet;
   a charging connector disposed in an inside of the housing recess so as to be coupled with the attachment plug; and
   an illumination light source embedded in an upper peripheral wall of the housing recess, wherein the illumination light source emits light downward from an upper portion of the housing recess,
   wherein an optical axis of the illumination light source is positioned closer to an opening of the housing recess than a front surface of the charging connector,
   wherein a first irradiation light emitted toward the opening of the housing recess than the optical axis is emitted obliquely downward from the charging inlet, and
   wherein a second irradiation light emitted toward a bottom of the housing recess than the optical axis is emitted to the charging connector,
   the charging device further comprising:
   a locking member that protrudes from an upper portion of the charging connector, and is fitted into the attachment plug for locking; and
   a first optical member fixed to the locking member,
   wherein the first optical member has any one function selected from a group consisting of a function of reflecting the second irradiation light, a function of accumulating the first irradiation light, and a function of guiding the first irradiation light and radiating the first irradiation light toward the opening of the housing recess.

* * * * *